Sept. 24, 1940.  C. SAURER  2,215,743
RESILIENT SUPPORT
Filed May 10, 1938  3 Sheets-Sheet 1
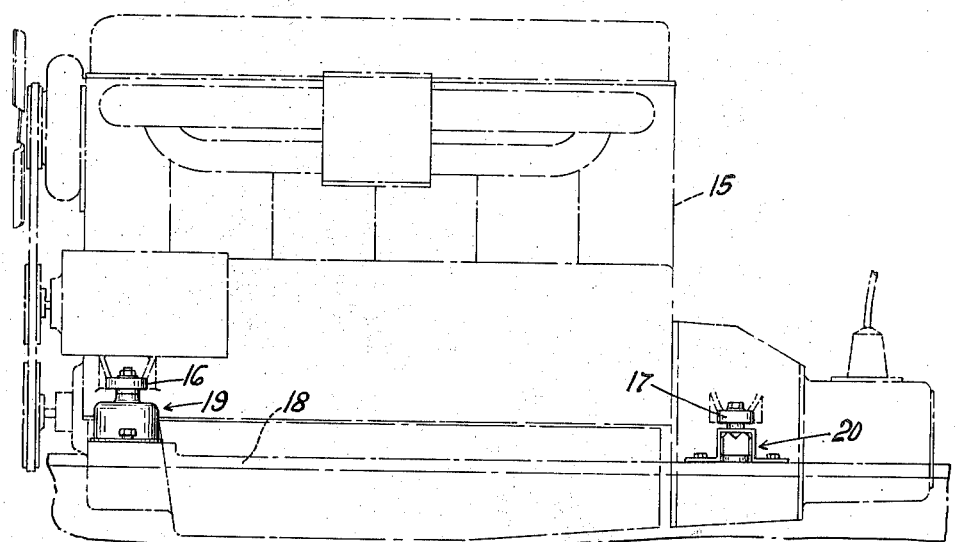
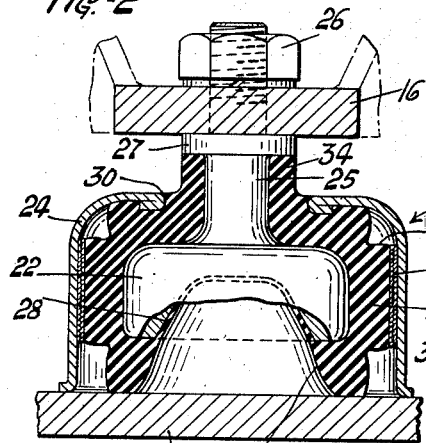
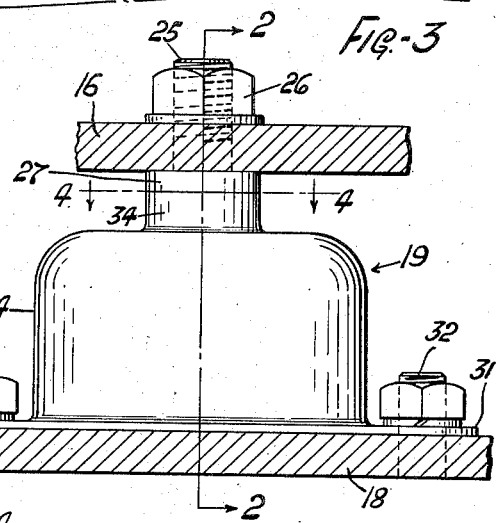
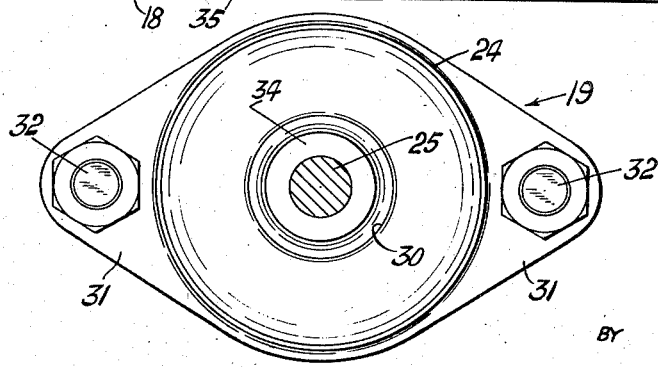
INVENTOR
Curt Saurer
BY Ely + Frye
ATTORNEYS Sept. 24, 1940.　　　　C. SAURER　　　　2,215,743
RESILIENT SUPPORT
Filed May 10, 1938　　　3 Sheets-Sheet 2
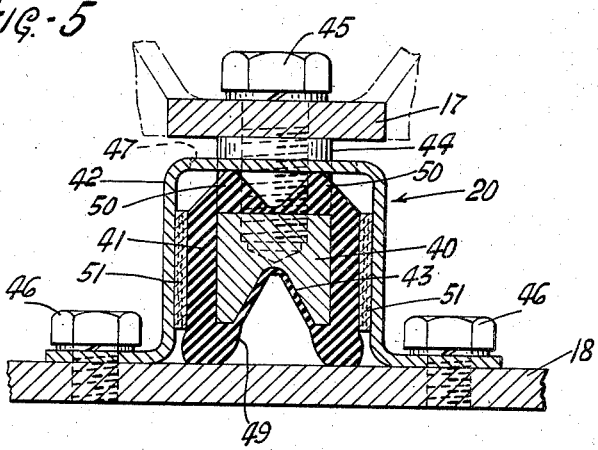
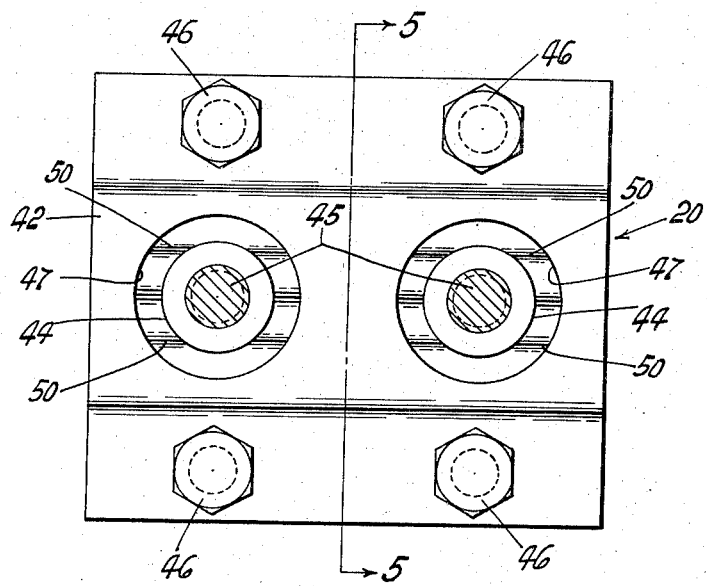
INVENTOR
Curt Saurer
BY
Ely & Frye
ATTORNEYS Sept. 24, 1940.                    C. SAURER                    2,215,743
                                RESILIENT SUPPORT
                             Filed May 10, 1938            3 Sheets-Sheet 3
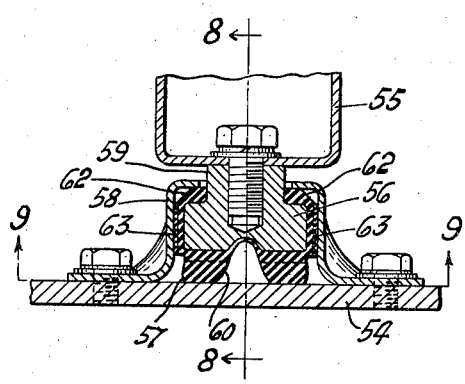
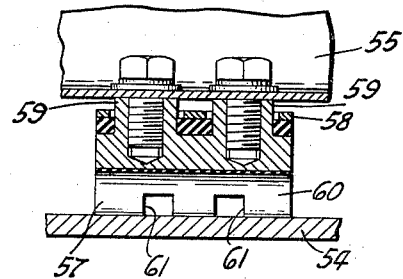
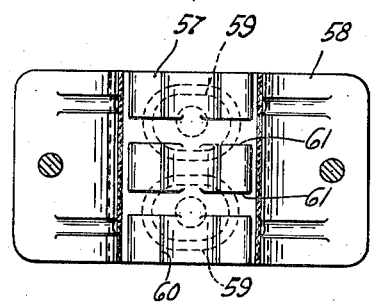
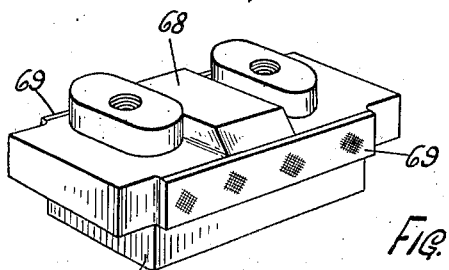
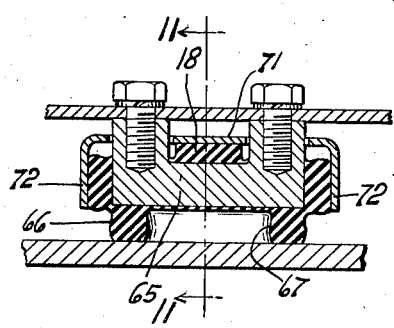
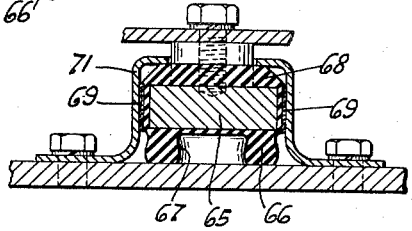
INVENTOR
Curt Saurer
BY
Ely & Frye
ATTORNEYS Patented Sept. 24, 1940

2,215,743

UNITED STATES PATENT OFFICE 2,215,743

RESILIENT SUPPORT

Curt Saurer, Akron, Ohio, assignor to The Firestone Tire & Rubber Company, Akron, Ohio, a corporation of Ohio Application May 10, 1938, Serial No. 207,051

8 Claims. (Cl. 248—22)

This invention relates to resilient supports, and more especially it relates to resilient means constituting a connection between a supporting and a supported structure, at least one of which is subject to vibration.

The support as illustrated herein is interposed between a vehicle motor and the frame or body of the vehicle, in which situation the support is especially adapted to prevent vibration and torsional and other strains of the motor from being transmitted to the vehicle body.

The chief objects of the invention are to provide in an improved manner for the suppression of engine vibrations; to provide a resilient mounting of the character mentioned that has directional stability; to provide a resilient support of the character mentioned that comprises friction producing means for the purpose of obtaining optimum vibration-damping effect. Other objects will be manifest as the specification proceeds.

Of the accompanying drawings:

Figure 1 is a side elevation of a vehicle motor and supporting frame showing resilient mountings of different types interposed between the frame and motor at the front and rear of the latter;

Figure 2 is a transverse section of the resilient mounting shown at the front in Figure 1, taken on the line 2—2 of Figure 3;

Figure 3 is a side elevation of the structure shown in Figure 2;

Figure 4 is a plan view of the mounting taken on the line 4—4 of Figure 3;

Figure 5 is a transverse section of the mounting shown at the rear of Figure 1, taken on the line 5—5 of Figure 6;

Figure 6 is a plan view of the structure shown in Figure 5;

Figure 7 is a transverse section of another embodiment of the invention;

Figure 8 is a section on the line 8—8 of Figure 7;

Figure 9 is a bottom plan view of the structure shown in Figure 7 as viewed from the line 9—9 thereof;

Figure 10 is a horizontal section of still another embodiment of the invention;

Figure 11 is a section on the line 11—11 of Figure 10; and

Figure 12 is a perspective view of the resilient element of the mounting shown in Figures 10 and 11.

Referring now to Figure 1 of the drawings, there is shown a conventional vehicle motor 15 of the internal combustion type having laterally projecting legs 16, 17 at front and rear thereof, a conventional frame member 18, and resilient mountings or supports 19, 20 interposed between the respective legs 16, 17 and the frame 18 and secured to each of them. The mounting 19 is constructed to oppose lateral vibration of the motor equally in all directions, and also to yieldably oppose vertical vibration of the motor, including bound and rebound and torque reaction. The details of the resilient support are shown in Figures 2 to 4 to which attention is directed.

The resilient support 19 comprises a metal core structure 22 that is connected to the motor-leg 16, a body of resilient rubber composition 23 enveloping said core and bonded thereto, as by vulcanization, and a cup-shaped metal cage or shell 24 enclosing the rubber body 23 and secured to the vehicle frame 18. The metal core 22 is a circular structure disposed on a vertical axis and formed with an upwardly extending axial stem 25 that terminates in a threaded portion of reduced diameter adapted to receive a nut 26 by which the leg 16 of the motor may be secured thereto. At the base of said threaded portion the stem is formed with a radially extending flange 27 upon which said motor leg may rest. In its bottom face the core 22 is formed with concavity 28 substantially of frusto-conical shape, said concavity being concentric with the axis of the core, and having its large diameter at the bottom of the core.

The metal casing 24 of the mounting is of inverted cup shape, the bottom thereof being open, and the top thereof being formed with an axial aperture 30 having a beaded edge, said aperture being somewhat larger in diameter than the flange 27 of core 22. The bottom margin of the casing, which rests upon the vehicle frame 18, is formed with a pair of oppositely extending apertured ears 31, 31 that are secured to said frame by bolts 32.

The rubber body 23 of the mounting completely encases all of the core 22 below the flange 27 thereof, said body having a portion 34 that projects through the aperture 30 of the casing, said portion surrounding the stem 25 and being of the same outside diameter as the flange 27 of the latter. The axial thickness of the rubber body, above and below the core 22, is substantially the same so that the core is positioned substantially centrally of the interior of the casing 24. The rubber is disposed in a thin layer or lining over the metal within the concavity 28 of the core, and said concavity is continued through the rubber body, as shown at 35, to the bottom thereof, the arrangement being such as to provide an air space in the bottom of the mounting when the rubber covered core is resting upon the vehicle frame 18. The height of the rubber body 23 that is confined within the casing 24 is slightly greater than the inside height of the casing, with the result that the rubber structure normally is under compressive stress in the direction of its axis thereof. Adjacent its top and bottom, exclusive of the projecting portion 34, the outside diameter of the rubber body 23 is substantially less than the inside diameter of the casing 24, and stands in spaced relation to the latter, the arrangement permitting deformation and displacement of the rubber under load. Medially of its height the rubber body 23 is formed with an integral peripheral band or flange 36, the width of which is substantially half the height of the stucture, exclusive of projecting portion 34, said flange carrying a facing of friction material 37 vulcanized thereto. The greatest outside diameter of the rubber body 23, including the flange 36 and friction facing 37, is greater than the inside diameter of the casing 24 with the result that when the mounting is in the assembled condition shown, the rubber between the core and friction facing is under radially directed compressive stress.

The friction material 37 preferably is square woven fabric or heavy duck that is impregnated with a suitable lubricant. Experience has shown that colloidal graphite suspended in castor oil is a satisfactory lubricant for the friction material, although other lubricants of similar characteristics may be employed. The castor oil has no deleterious effect upon the rubber body 23, and is not affected by temperatures from minus 14 degrees to plus 150 degrees. The friction material is self lubricating, and will remain lubricated for the life of the vehicle. The lubricated friction material will not squeak, and it has no "break-away" action such as obtains in all other friction materials, such as brake lining. The rubber structure back of the friction facing, being under radial compressive stress, yieldingly urges the friction material 37 against the inner face of the casing 24 at all times.

It will be seen that the presence of the friction facing 37 will have no effect on the ability of the mounting to resist lateral vibration of the motor 15 in all directions by reason of the resistance of the rubber to compression. Vertical vibration is opposed by the rubber cushion, downward movement of the core 22 also being opposed by the resistance to compression of the air confined in the concavity 35 in the bottom of the mounting. Slight vertical vibration of the core 22 will also be opposed by the rubber of the flange 36 which is thereby subjected to shearing strain. but when such vibrations exceed a determinate amplitude, the friction material will slide upon the surface of the casing, with the result that a divided damping of the vibration is effected.

The resilient support 20 at the rear end of the motor 15 is best shown in Figures 5 and 6 of the drawings. It comprises a metal core 40, a body of resilient rubber composition 41 mounted thereon and vulcanized thereto, and a metal casing 42 substantially enclosing the rubber covered core. The core 40 is substantially square in cross-section and of considerably greater length and width. In the bottom face of the core is a longitudinally extending, relatively deep groove 43 having flat sides that diverge at an angle of about 60 degrees. The top face of the core is formed with two upwardly extending bosses 44, 44 that are spaced from the ends of the core and from each other, each boss having a diameter equal to the width of the core. Each boss 44 has a threaded axial bore for receiving a cap screw 45 by means of which the core is connected to the motor leg 17, the bosses being of such height as to extend somewhat above the top of casing 42. The casing 42 is a sheet metal structure of the same length as the core 40. It comprises two parallel vertical sides and a top portion united to the two sides at its lateral margins and bridging the space between the sides, the bottom portions of the sides being bent at right angles, in opposite directions, and apertured to receive set screws 46, 46 by means of which the casing is secured to the vehicle frame 18. The top side of the casing is formed with two apertures 47, 47 that are of larger diameter than the bosses 44, and normally are disposed concentrically thereof.

The rubber body 41 covers the core 40 except the end faces thereof and is formed in its bottom with a longitudinally extending groove 49 that is coincident with groove 43 of the core, the rubber but thinly coating the faces of said core-groove. The top of the rubber body is formed with two longitudinally extending ribs 50, 50 that define an intermediate groove, the tops of said ribs bearing against the under face of the top of casing 42. The overall height of the rubber body 41 is slightly greater than the inside height of the casing 42 so that the rubber normally is under compressive stress in the direction of the axes of bosses 44. Mounted upon the respective lateral faces of the rubber body 41 are longitudinally extending strips of friction material 51, 51. The friction strips 51 are bonded to the rubber by vulcanization, and consist of heavy woven duck impregnated with the castor oil-graphite lubricant hereinbefore mentioned. The overall width of the rubber body 41, including the friction strips 51, is slightly greater than the inside width of the casing 42, with the result that the rubber body is placed under transverse compressive stress when mounted in the casing. As shown, the area of each friction strip 51 is about half the area of the casing-surface that it abuts, but this ratio may be varied somewhat if desirable.

The resilient support 20 is mounted between the frame 18 and motor 15 with its long sides disposed transversely of the axis of the latter. The arrangement is such that vertical vibration and fore and aft vibration of the engine are yieldingly opposed by the mounting by reason of the resistance of the rubber to additional compressive stress. Lateral vibration of the motor is opposed by the rubber body which is subjected to shearing strain thereby. If the shearing strain exceeds a determinate maximum, the core and rubber body will slide relatively of the casing, which movement will be resisted by the friction between the casing and the friction material 51. Such sliding movement is of course relatively small, and in no case can it exceed the clearance between the casing and the studs 45 that extend through the apertures 47 in said casing. As in the resilient mounting 20, there is ample unoccupied space within the casing to permit displacement of the rubber of the body 41 when under load.

The embodiment of the invention shown in Figures 7, 8 and 9 of the drawings is substantially similar to that shown in Figures 5 and 6. It is positioned between a supporting member 54 and a supported member 55, and comprises a metal core 56, a rubber body 57 enveloping the same, and a casing 58 confining said rubber body. The metal core 56 is of substantially greater width than thickness, and is formed at its top with bosses 59, 59 that are prolate in section in the direction transversely of the core. The rubber body 57 covers the core except the end faces thereof and the bosses 59. The bottom of the rubber body is formed with a relatively deep longitudinal groove 60 that is intersected by two relatively shallow transverse grooves 61, 61, and the upper margins of the rubber body are cut off or beveled at 62, 62, the arrangement providing space within the casing to enable displacement of the rubber under load. Bonded to the respective lateral faces of the rubber body 57 are strips of friction material 63 of the kind previously described, which material is impregnated with lubricant. The chief difference between this embodiment of the invention and those previously described is that there is but a relatively thin cushion of rubber between the friction strips 63 and the adjacent lateral faces of the core. The casing is essentially the same as that shown in Figures 5 and 6, its inside height and width being slightly smaller than the same dimensions of the rubber body 57 so that the latter is placed under vertical and transverse compressive stress.

This embodiment of the invention functions generally in the same manner as that shown in Figures 5 and 6, except that transverse movement of the core is practically restrained by reason of the small amount of rubber between the core and the friction strips. For the same reason there will be less longitudinal movement of the core before the friction strips move relatively of the core to produce retarding friction.

The embodiment of the invention shown in Figures 10 to 12 is very similar to that shown in Figures 7 to 9 except that yielding means is provided to supplement the friction strips in opposing longitudinal movement of the core relatively of the casing. The core 65 of the mounting is practically identical with the core 56 previously described. The core 65 has a body of resilient rubber composition 66 vulcanized thereupon, which body is relatively thick at the bottom of the core and formed thereat with a recess 67 that is rectangular in shape, and which constitutes a closed air space when the rubber body rests upon a flat surface as shown. On its top the rubber body is formed with a centrally disposed, wide, transverse rib 68, the height of which is somewhat less than the height of the bosses on the core 65. Friction strips 69, 69 of the type hereinbefore described are mounted upon the lateral faces of the rubber body, there being a relatively thin layer of rubber between each friction strip and the lateral face of the core. The end faces of the core are covered with relatively heavy layers of rubber of about the same thickness as the bottom face of the core.

The rubber covered core fits within a metal casing 71 that is similar to casing 58 of the previously described embodiment except that its opposite ends are formed with downwardly turned portions 72, 72 that engage the opposite end portions of the rubber body 66. The inside dimensions of the casing are slightly smaller than the overall dimensions of the rubber structure 66 so that the latter is under normal compressive stress in vertical, transverse, and longitudinal directions. The mounting functions similarly to that shown in Figures 5 and 6 except that the friction means is supplemented by rubber under compressive stress for opposing longitudinal movement of the core relatively of the casing.

Other modification may be resorted to without departing from the spirit of the invention or the scope thereof as defined by the appended claims, which are not limited wholly to the specific construction described.

What is claimed is:

1. An insulating resilient support positionable between two relatively movable members, said support comprising a core structure attachable to one of said relatively movable members, a casing attachable to the other relatively movable member and disposed about the core in spaced relation thereto, a body of resilient material disposed on all sides of said core and adapted yieldingly to oppose relative movement between said casing and said one of said movable members, and friction material interposed locally between the resilient material and said casing and having friction faces parallel to the direction of applied load for frictionally opposing relative movement between core and casing at least in one direction, while coacting with said resilient material to oppose relative movement between said casing and said core in a direction at right angles to the direction of frictional opposition.

2. A combination as defined in claim 1 in which the core and casing are circular structures, and the frictional material is mounted upon the peripheral face of the resilient material interposed therebetween.

3. A combination as defined in claim 1 in which the core and casing are rectangular structures, and the frictional material is mounted upon the longitudinal faces of the resilient material disposed therebetween.

4. A combination as defined in claim 1 in which the resilient material is normally under compressive stress, and urges the friction material into frictional engagement with the casing.

5. A combination as defined in claim 1 in which the thickness of the resilient material between the core and friction material on two opposite sides of the core is relatively small as compared to the thickness of the resilient material in other regions of the mounting.

6. An insulating resilient support comprising a casing, a core member, yieldable material interposed between said casing and said core to resist forces in certain directions and yieldable material associated with said core adapted to take thrusts at right angles to the thrusts taken by said casing and said first-named resilient material, friction means associated with said first-named resilient material and coacting with said casing to frictionally resist movement against said second resilient material after the latter has commenced to yield.

7. A resilient support adapted to be positioned between two relatively movable members, said support comprising a core element attachable to one of said relatively movable members, a casing attachable to the other relatively movable member and disposed about said core element in spaced relation thereto, resilient material disposed on all sides of said core element and between the later, said casing and said one of said movable members for yieldingly opposing relative movements between said core element, said casing and said one of said movable members, and friction material secured to the outer faces of said resilient material for frictionally engaging said casing.

8. An insulating resilient support adapted to be positioned between two relatively movable members, said support comprising a core having surfaces for opposing forces in directions at an angle to each other, an outer casing disposed about opposite lateral faces of said core, resilient material between the surfaces of said core and said casing for resiliently opposing relative movement therebetween, friction material secured to the outer lateral faces of said resilient material for frictionally engaging said casing, said resilient material on said lateral faces being operably associated with the resilient material on the other faces so that a load applied to said support substantially parallel to the friction faces will compress said resilient material on another face of said core to resiliently increase the frictional contact between said friction material and said casing.

CURT SAURER.